3,384,116
PNEUMATIC DEVICE OF LONG-TIME MEMORY
Robert Jurjevich Fedoseev and Jury Alexeevich Konjkov, Moscow, U.S.S.R., assignors to Nauchno-Issledovatelsky Institute Teploenergeticheskogo Priborostroenija, Moscow, U.S.S.R.
Filed May 6, 1964, Ser. No. 365,324
5 Claims. (Cl. 137—609)

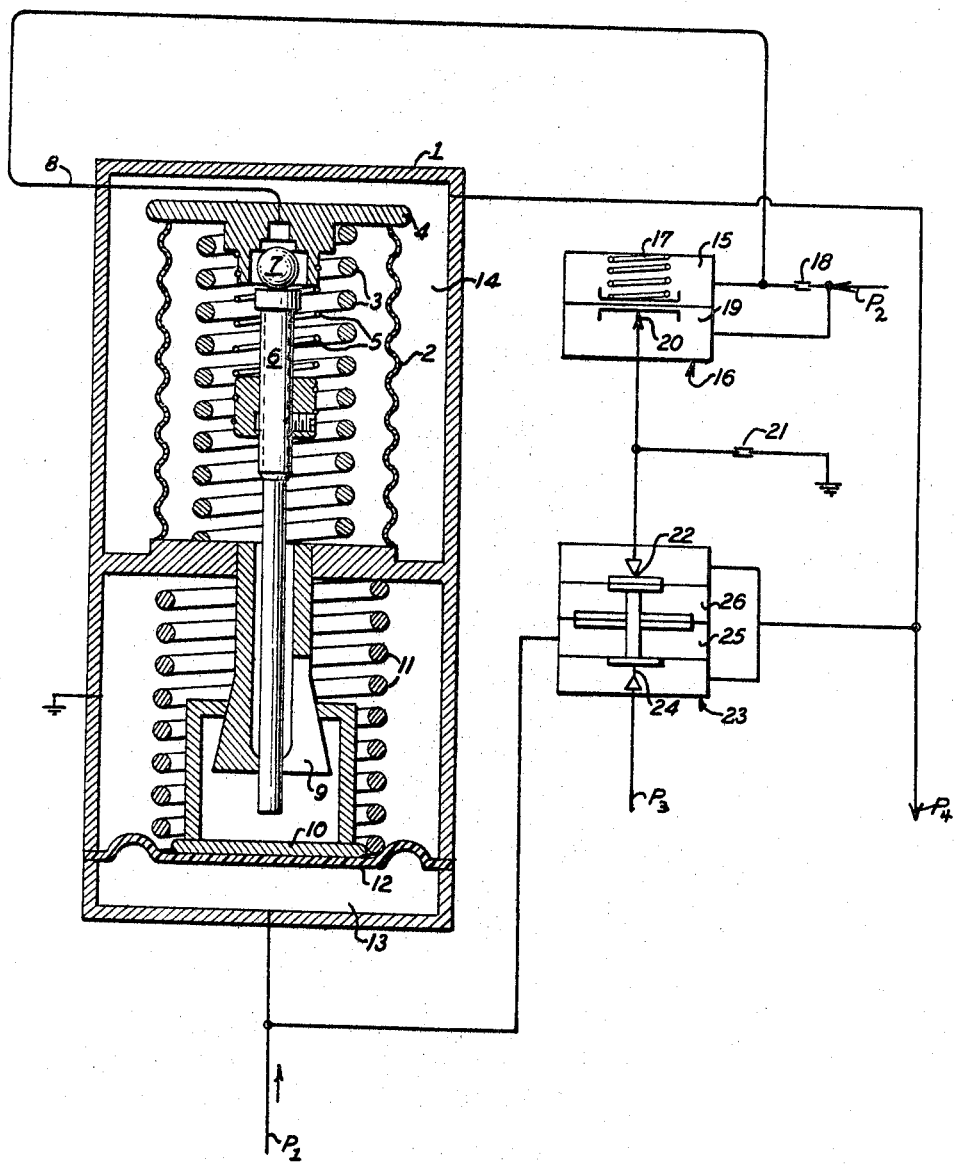

The present invention relates to pneumatic devices of long-time memory, and particularly, to pneumatic devices used to store analog signals in the centralized pneumatic control and adjustment systems in pneumatic multi-channel regulators, optimizers and controlling apparatus.

Attempts have been made to create a memory cell based on the principle of cutting off pressure within a closed volume. However, this memory cell is not able to store information for a long period because the ambient temperature greatly affects its operational stability and the barometric pressure changes cause errors; it is impossible to obtain absolute hermetic contact whereas even tiny leakages within the pneumatic enclosure are not permissible; the error value depends upon the non-linearity of the sensitive element.

According to the invention these objects are achieved by the construction of a pneumatic device of long-time memory comprising a storing unit adapted for receiving a pulse of a pressure medium, the storing unit including a measuring chamber; an inverter coupled to a supply of pressure fluid and having active and inactive states; valve means in the form of a three-diaphragm double-contact valve coupled to the measuring chamber and to a pressure inlet line, the valve means being responsive to the pulse of pressure medium to pressurize the measuring chamber to the value of the pressure in said inlet line; and sensing means in the storing unit for responding to the pressure in the measuring chamber, the sensing means being coupled to the inverter to activate the same if the pressure in the measuring chamber drops below the value at which it was pressurized, said inverter being coupled to the valve means such that when activated it passes fluid from said supply to said valve means and therefrom to said measuring chamber until the pressure in said chamber as detected by the sensing means reaches said value at which the chamber was originally pressurized.

The sensing means is a memory unit which comprises a movable sylphon in the measuring chamber having a movable bottom acted on by a spring ond containing a bleed line in communication with the inverter for controlling the operation thereof; a displaceable member facing the bleed line; resilient means connecting the sylphon and the displaceable member; and clamping means for clamping the displaceable member in a fixed position when the chamber is originally pressurized at the value of the pressure in the inlet line, said clamping means being supported by the storing unit to release the displaceable member when the storing unit receives said pulse to enable the displaceable member to assume an equilibrium position under the action of the pressure in the inlet line before being clamped.

The inverter comprises a single diaphragm valve with a spring and two control chambers, one of which is connected to the supply directly and the other through a choke, a bleed line from the first chamber being connected to the valve means and to atmosphere via a choke, the single diaphragm valve acting to close the bleed line is opened when pressure falls in the measuring chamber.

The three-diaphragm double-contact valve consists of a housing divided by three rigidly connected diaphragms to divide the same into four chambers, two of which are connected together to the outlet, a first of which is connected to the inverter and the second of which is connected to the pressure inlet line. The double-contact valve is subjected to the pressure in the third and fourth chambers for selectively closing the inlet line and the line to the inverter. The third chamber is subjected to a permanent control pressure and the fourth chamber is connected to receive the pulse of the pressure medium which is applied to the storing unit. The first and second chambers are connected together and to the measuring chamber to enable pressurization of the first chamber to the value of the pressure in the inlet line when the latter is open and the bleed line is closed by the valve member during application of said pulse.

The present invention will be more fully understood from the following description given with reference to the accompanying drawing which schematically shows a pneumatic device of long-time memory.

The penumatic device of long-time memory comprises a housing 1, and a sylphon 2 within said housing, a spring 3 acts on a movable bottom 4 secured to sylphon 2. The bottom 4 is connected by a spring 5 to a rod 6. Said rod acts on a ball 6 closing a bleed line 8 placed in movable bottom 4 of sylphon 2. Rod 6 is received in tong or clamp bearing 9 fixed in housing 1, said tong 9 being supported in a bushing 10 which is acted on from one end by a spring 11 and from the other by a diaphragm 12. Chamber 13 is connected to control line $P_1$ for receiving a pulse of a pressure medium. A measuring chamber 14 is connected to outlet line $P_4$.

Bleed line 8 is flexible and is constructed for example of a rubber pipe. The bleed line 8 is connected to control chamber 15 of a single-diaphragm valve 16 having a spring 17 and further through a choke 18 to a supply line $P_2$. Said single diaphragm valve 16 operates as an inverter as will be explained hereinafter.

Said supply line $P_2$ is connected to chamber 19 of single diaphragm valve 16, and bleed line 20 is connected through choke 21 to the atmosphere and to bleed line 22 of three-diaphragm double-contact valve 23, the bleed line of which, in its turn is connected to inlet line $P_3$.

The lines after bleed lines 22 and 24 are connected to outlet line $P_4$, and chamber 25 of valve 23 is connected to control line $P_1$.

Chamber 26 of three-diaphragm double-contact valve 23 is permanently connected to the source of pressure fluid. One of the master pressures within control line $P_1$ exceeds the supply pressure and the other is smaller than the latter; hence, when a larger master pressure is supplied to control line $P_1$, bleed line 22 is closed and bleed line 24 is opened; in the case in which smaller master pressure is supplied at $P_1$, valve 23 closes bleed line 24 and opens bleed line 22 correspondingly.

When pressure is supplied to control line $P_1$, diaphragm 12 moves and pushes bushing 10, whereby bearing 9 opens releasing rod 6; three-diaphragm double-contact valve 23 moves closing bleed line 22 and opening bleed line 24, inlet line $P_3$ thus being in communication with outlet line $P_4$.

The device is set for the mode of operation to store pressure supplied into inlet line $P_3$.

When pressure is supplied to the inlet line, sylphon 2 moves assuming such a position in which the force, developed by pressure within inlet line $P_3$ and acting upon the effective area of sylphon 2, will be equalized by spring 3 and the elasticity of said sylphon 2. The pressure appearing within bleed line 8 will correspond to the force, with which spring 5 presses rod 6 towards ball 7. The pressure within bleed line 8 is preset, providing that it is always less than the supply pressure.

Spring 17 of inverter valve 16 is adjusted so that with a permanent preset pressure within bleed line 8, bleed 20 is closed and, consequently, the pressure within bleed line 20 becomes equal to zero, as this line is connected through choke 21 to the atmosphere alone.

When the pressure in control line $P_1$ is cut-off, bushing 10 engages bearing 9 which in turn clamps rod 6 and thus the position of rod 6 is fixed, said position corresponding to the pressure within inlet line $P_3$.

When bearing 9 clamps rod 6, valve 23 operates, due to the cut-off of pressure in line $P_1$. Thus line 22 opens and bleed line 24 closes. The pressure within outlet line $P_4$ diminishes, since, initially, outlet line $P_4$ is connected through choke 21 to the atmosphere alone; hence movable bottom 4 of sylphon 2 moves and bleed line 8 opens. The pressure within the flexible bleed line 8 becomes lower, thus opening bleed line 20 as well as outlet line $P_4$, the pressure in which will increase until movable bottom 4 of sylphon 2 approaches rod 6.

Said movable bottom 4 of sylphon 2 assumes a stabilized position when the pressure within outlet line $P_4$ equals the pressure within inlet line $P_3$ at the moment of storage, that is during the pressure drop within control line $P_1$.

In this way the pressure in the inlet line is stored.

The device thus operates in the following manner.

When pressure is supplied to inlet line $P_1$, the bleed line 22 of valve 23 is closed and the valve 23 passes the inlet pressure $P_3$ to the outlet line $P_4$. The closure of bleed line 22 prevents the pressure fluid from being vented from the outlet line $P_4$ via the choke 21 into the atmosphere. At the same time, due to the pressure of the inlet line $P_1$ acting in chamber 13, the clamp 9 releases the rod 6.

When the pressure in line $P_4$ is equal to the pressure in inlet line $P_3$ the bottom 4 of the sylphon 2 assumes a certain equilibrium position defined by the value of the pressure in inlet line $P_3$, the elasticity of the sylphon and spring 3.

When the signal in control line $P_1$ is cut off, the spring 11 forces the clamp 9 to fix the rod 6 in a position corresponding to the value of the inlet signal which is required to be memorized, i.e., maintained constant.

In addition, the valve 23 shuts off the inlet line $P_3$ from the outlet line $P_4$, and connects the line of the bleed 20 of the valve 16 to the outlet line $P_4$.

The pressure in outlet line $P_4$ drops, causing the bottom 4 of the sylphon 2 to rise, whereby the bleed line 8 is moved away from the ball 7, thus increasing fluid flow from the supply line $P_2$ through the enlarged clearance between the ball 7 and the bleed line 8. In turn, this causes the pressure in the chamber 15 of the valve 16 to drop and the diaphragm to move upward, opening the bleed line 20 of the valve 16. The outlet pressure $P_4$ will then rise as a result of the fluid being directed from the supply line $P_2$ into the outlet line $P_4$.

Pressure will continue to rise in the outlet line $P_4$ until it reaches the previous level. As the pressure in outlet line $P_4$ rises, the bottom 4 of the sylphon 2 descends causing the bleed line 8 to approach the ball 7, thus reducing the air flow through the clearance between the bleed line 8 and the ball 7. This causes the pressure to rise in the chamber 15 of the valve 16 and the diaphragm to move down, closing the bleed line 20 of the valve 16, the pressure in the outlet line $P_4$ decreasing as a result of the release of fluid via the valve 23 and choke 21 into the atmosphere. The pressure will continue to drop in the outlet line $P_4$ until it descends to the initial level.

Though the present invention is described in accordance with preferable embodiment it is understood that certain changes and variants may take place, e.g., the three-diaphragm double-contact valve may be replaced by a double-diaphragm double-contact valve or by a single-diaphragm double-contact valve; also the usual amplifying relays may be used as inverters.

These variants are considered within the scope and concept of the invention defined in the appended claims.

What is claimed is:

1. A pneumatic device comprising a storing unit adapted for receiving a pulse of a pressure medium, said storing unit including a measuring chamber, an inverter coupled to a supply of pressure fluid and having active and inactive states, valve means coupled to said measuring chamber and to a pressure inlet line, said valve means being responsive to the pulse of pressure medium to pressurize the measuring chamber to the value of the pressure in said inlet line, and sensing means in said storing unit for responding to the pressure in the measuring chamber, said sensing means being coupled to said inverter to activate the same if the pressure in said measuring chamber drops below said value at which it was pressurized, said inverter being coupled to the valve means such that when activated it passes pressure fluid from said supply to said valve means and therefrom to said measuring chamber until the pressure in said chamber, as detected by the sensing means, reaches said value at which the chamber was originally pressurized, said sensing means including means sensitive to the pulse of pressure medium for maintaining a portion of said sensing means in a fixed position corresponding to the original value of pressure in said measuring chamber after termination of said pulse.

2. A pneumatic device as claimed in claim 1 wherein said sensing means and maintaining means comprises a movable sylphon in said measuring chamber, a bleed line in said sylphon in communication with said inverter for controlling the operation thereof, a displaceable member facing the bleed line, resilient means connecting the sylphon and the displaceable member, and clamping means in the storing unit for clamping the displaceable member in a fixed position when the chamber is originally pressurized at the value of the pressure in the inlet line, said clamping means being supported by the storing unit to release the displaceable member when the storing unit receives said pulse to enable the displaceable member to assume an equilibrium position under the action of said pressure in the inlet line, before being clamped.

3. A pneumatic device as claimed in claim 1 wherein said storing unit comprises a housing, said sensing means and maintaining means including a sylphon having one end fixed in said housing and an opposite end with a movable bottom member secured thereto, a bleed line in said bottom member in communication with said inverter for controlling the operation thereof, a ball facing said bleed line and received by the bottom member, a spring inside the sylphon acting upon said bottom member and said housing, a rod displaceably supported in said housing and contacting said ball, a second spring connected to said rod and said bottom member and urging the rod against the ball, a clamp fixed in said housing and encircling the rod for selectively clamping the same, a displaceable bushing surrounding the clamp for engaging the clamp to effect clamping of the rod, a third spring connected to said bushing and to the housing and urging the bushing to a position in which it causes the bushing to act on the clamp to effect clamping of the rod, and a flexible diaphragm fixed in said housing and subject to the pressure of said pulse of pressure medium, said diaphragm being operatively coupled to said bushing to urge the same, against the action of said third spring, to a position in which the clamp frees the rod.

4. A pneumatic device as claimed in claim 1 wherein said inverter comprises two control chambers, a first connected directly to the supply of pressure fluid, and a second connected to said supply through a choke, a bleed line from said first chamber connected to said valve means and to atmosphere via a choke, and a spring loaded single diaphragm valve acting to close said bleed line, said sensing means including means establishing communication between the measuring chamber and said second chamber to cause opening of said bleed line by said single diaphragm valve when pressure falls in said measuring chamber.

5. A pneumatic device as claimed in claim 4 wherein said valve means comprises a double contact valve including a housing and three diaphragms secured in said housing to divide the same into four chambers, a first of said chambers being connected to said bleed line from the inverter, and a second being connected to said pressure inlet line, a displaceable valve member subjected to the pressure of fluid in the third and fourth chambers for selectively closing the inlet line and said bleed line, said third chamber being subjected to a permanent control pressure, the fourth chamber being connected to receive said pulse of the pressure medium, said first and second chambers being connected together and to the measuring chamber to enable pressurization of said first chamber to the value of the pressure in the inlet line when the inlet line is open and the bleed line is closed by said valve member during application of said pulse.

References Cited

UNITED STATES PATENTS

| | | | |
|---|---|---|---|
| 2,911,992 | 11/1959 | Watrous | 137—86 |
| 3,036,778 | 5/1962 | Dillman | 137—48 X |

FOREIGN PATENTS 1,352,826   1/1964   France.

MARTIN P. SCHWADRON, *Primary Examiner.*